United States Patent [19]

Umezawa et al.

[11] Patent Number: 5,351,908

[45] Date of Patent: Oct. 4, 1994

[54] WEBBING RETRACTOR

[75] Inventors: Yoshio Umezawa; Hisao Yamada, both of Aichi, Japan

[73] Assignee: Kabushiki Kaisha Tokai-Rika-Denki Seisakusho, Aichi, Japan

[21] Appl. No.: 24,453

[22] Filed: Mar. 1, 1993

[30] Foreign Application Priority Data

Mar. 9, 1992 [JP] Japan .............. 4-011621[U]

[51] Int. Cl.$^5$ ............................ B65H 75/48
[52] U.S. Cl. ................ 242/383.4; 242/384.4
[58] Field of Search ............ 242/107.4 R, 107.4 B, 242/107.4 A, 107.4 D

[56] References Cited

U.S. PATENT DOCUMENTS

| 4,113,201 | 9/1978 | Ziv ........................ 242/107.4 R |
| 4,522,350 | 6/1985 | Ernst ...................... 242/107.4 R |
| 4,729,524 | 3/1988 | Befort et al. ............. 242/107.4 R |
| 4,749,142 | 6/1988 | Saitow .................... 242/107.4 R |
| 4,749,143 | 6/1988 | Tsukamoto et al. ...... 242/107.4 R |

FOREIGN PATENT DOCUMENTS

| 63-110155 | 7/1988 | Japan . |
| 3126745 | 12/1991 | Japan . |
| 315407 | 4/1994 | Japan . |

Primary Examiner—Daniel P. Stodola
Assistant Examiner—Eileen A. Dunn
Attorney, Agent, or Firm—Sixbey, Friedman, Leedom & Ferguson

[57] ABSTRACT

A webbing retractor winds-up a webbing by a winding shaft. A lock ring rotates according to movement of the winding shaft. A rotational delay of the lock ring with respect to the winding shaft is generated when the webbing is rapidly drawn-out. The rotational delay of the lock ring causes a lock plate to prevent the webbing from being drawn-out. An engaging member is movable to a separated position where the engaging member is separated from the lock ring, and to an engaging position where the engaging member engages the lock ring to generate rotational delay. Further, the engaging member is urged in one of the direction of the separated position and the direction of the engaging position when the engaging member is separated from a neutral position disposed at an intermediate portion between the separated position and the engaging position. A moving member moves with the winding shaft and rotates. A guide member in the moving member guides the engaging member to an engaging waiting position positioned on an engaging position side with respect to a neutral position and the engaging member disengages the lock ring by moving the moving member according to movement of the winding shaft to rotate as the webbing is drawn-out. The guide member guides the engaging member to the engaging position by moving the moving member with the winding shaft to rotate as the webbing is retracted in a condition where the engaging member is positioned at the engaging waiting position.

21 Claims, 8 Drawing Sheets

WEBBING RETRACTOR

BACKGROUND OF THE INVENTION

1. Field of the Invention

The present invention relates to a webbing retractor for use in the vehicle and including an emergency locking retractor (hereafter abbreviated as ELR) and an automatic locking retractor (hereafter abbreviated as ALR).

2. Description of the Related Art

There are webbing retractors including those with ELR function and ALR function. The ELR function enables the drawing out and retracting of an occupant securing webbing in a normal condition, and blocks the drawing-out of the webbing when a vehicle rapidly decelerates. The ALR function blocks the drawing-out of the webbing at any time after mounting the webbing irrespective of the conditions.

In the webbing retractors constructed as set forth above, there are well-known conventional webbing retractors as will now be described. A winding shaft is rotatably supported by a frame. It is possible to retract the occupant securing webbing around the winding shaft. A lock ring is provided for the winding shaft through a spring member. The lock ring is rotatable according to the movement of the winding shaft by the urging force of the spring member, and is relatively rotatable with respect to the winding shaft by resisting the loaded force of the spring member.

A lock plate is provided for the lock ring so as to be rotatable with the lock ring. A ratchet wheel secured to the frame, is disposed around the lock plate. Further, the webbing retractor is provided with acceleration detecting means which prevents the rotation of the lock ring when the vehicle rapidly decelerates. The rotation of the lock ring is blocked so that relative rotation is caused between the winding shaft and the lock ring against the urging force of the spring member. Accordingly, external teeth of the lock plate engage internal teeth of the ratchet wheel.

As set forth above, in a normal condition, the occupant can easily drive since the webbing can be freely retracted and drawn-out from the winding shaft. Further, when the vehicle rapidly decelerates, the drawing-out of the webbing is blocked so that the occupant is secured.

On the other hand, an ALR lever is provided so as to employ a lock mechanism of the winding shaft as ALR. The ALR lever is provided with a switching pawl including an engaging claw for removably engaging external teeth provided on an outer periphery of the lock ring, and a releasing arm provided for the switching pawl on an end opposed to the engaging claw. When the releasing arm is pressed, the ALR lever is rotated about a supporting pin provided at a boundary portion between the switching pawl and the releasing arm. Consequently, a condition where the engaging claw is removed from the external teeth of the lock ring, i.e., an ELR condition is changed into a condition where the engaging claw engages the external teeth of the lock ring, i.e., an ALR condition. Further, in the webbing retractor, a cam is used as means for pressing the releasing arm. The cam is driven by the rotation of a decelerating gear for decelerating the rotation of the winding shaft.

A substantially maximum amount of the webbing must be drawn-out in order to switch over the lock mechanism of the winding shaft from ELR to ALR. When a substantially maximum amount of the webbing is drawn-out, the rotation of the winding shaft in the webbing drawing-out direction is transmitted according to the movement of the webbing to the cam via the decelerating gear. Hence, the releasing arm is pressed by the cam so that the ALR lever is rotated about the supporting pin so as to engage the engaging claw engaging the external teeth of the lock ring with the external teeth. As a result, the lock mechanism is switched over to ALR.

However, as set forth above, in the conventional webbing retractor, the lock mechanism is switched over from ELR to ALR by the pressing of the releasing arm by the cam when a substantially maximum amount of the webbing is drawn-out. Therefore, it is necessary to provide high dimensional accuracy of the cam so as to reliably press the releasing arm, and high dimensional accuracy of the decelerating gear so as to enable the transmission of the force for pressing the releasing arm to the cam when a substantially maximum amount of the webbing is drawn-out. Further, the cam and the decelerating gear has to be assembled with a high assembling accuracy. Thus, it has been complicated to manufacture and assemble the cam and the decelerating gear.

As described hereinbefore, the lock mechanism must be reliably switched over from ELR to ALR. That is, it is necessary to provide a slightly elongated webbing so as to avoid a condition where the lock mechanism can not be switched over from ELR to ALR even though the maximum amount of the webbing has been drawn-out. As a result, there are drawbacks due to increased cost and the like.

SUMMARY OF THE INVENTION

In view of the facts as set forth above, it is an object of the present invention to provide a webbing retractor which can be reliably switched over from ELR to ALR without providing high assembling accuracy of the components.

A webbing retractor of the present invention is provided with a winding shaft for winding-up a webbing, a relative rotary member for rotating according to movement of the winding shaft, and for generating rotational delay with respect to the winding shaft due to at least one of a rapid drawing-out of the webbing and sudden deceleration of a vehicle, lock means for preventing a drawing-out of the webbing from the winding shaft by the rotational delay of the relative rotary member, an engaging member being movable to a separated position where the engaging member is separated from the relative rotary member and an engaging position where the engaging member engages the relative rotary member to generate the rotational delay of the relative rotary member, and being urged in either direction of a direction of the separated position and a direction of the engaging position in case the engaging member is separated from a neutral position disposed at an intermediate portion between the separated position and the engaging position, a moving member for moving with the winding shaft to rotate, and guiding means provided for the moving member for guiding the engaging member by rotating the moving member according to movement of the winding shaft as the webbing is retracted to an engaging waiting position which is positioned on the engaging position side with respect to the neutral position and the engaging member disengages the relative rotary member, and for guiding the engaging member so as to move to the engaging position by rotating the moving member according to the movement of the winding shaft as the webbing is wound-up in a condition where the engaging member is positioned at the engaging waiting position.

According to the present invention as set forth above, in case the webbing is not rapidly drawn-out when the engaging member is positioned at the separated position where the engaging member is separated from the relative rotary member (i.e., in an ELR condition), the rotational delay of the relative rotary member is never generated. Consequently, it is possible to freely draw-out of the webbing without preventing the drawing-out of the webbing by the lock means.

On the other hand, in case the engaging member is positioned at the engaging position (i.e., in an ALR condition), the rotational delay of the relative rotary member is generated so that the lock means prevents the webbing from being drawn-out from the winding shaft.

The webbing retractor of the present invention can be switched over from ELR to ALR by drawing-out the webbing. When the webbing is drawn-out, the moving member having the guide means is moved with the rotation of the winding shaft, and is rotated. Hence, the engaging member is moved to the engaging waiting position which is positioned on the engaging position side with respect to the neutral position and the engaging member disengages the relative rotary member. When the webbing is retracted in this condition, the moving member is moved with the rotation of the winding shaft and is rotated, and the guide means guides the engaging member to the engaging position. As a result, the engaging member engages the relative rotary member, resulting in the ALR condition.

As set forth above, in the webbing retractor of the present invention, the engaging member is positioned at the engaging waiting position by the guide member when the webbing is drawn-out, and engages the relative rotary member when the webbing is retracted, resulting in the ALR condition. It is not necessary to set a high-accuracy retracting amount of the webbing when switched over to ALR, and it is only necessary to guide the engaging member to the engaging position. Therefore, it is not necessary to manufacture high-accuracy guide means, or to assemble the guide means with high assembling accuracy.

According to the present invention as set forth above, there in an excellent effect in that it is possible to obtain a webbing retractor which can be reliably switched over from ELR to ALR.

DESCRIPTION OF THE PREFERRED EMBODIMENTS

A description will now be given of one embodiment of a webbing retractor of the present invention with reference to FIGS. 1 to 9.

Figure 1:
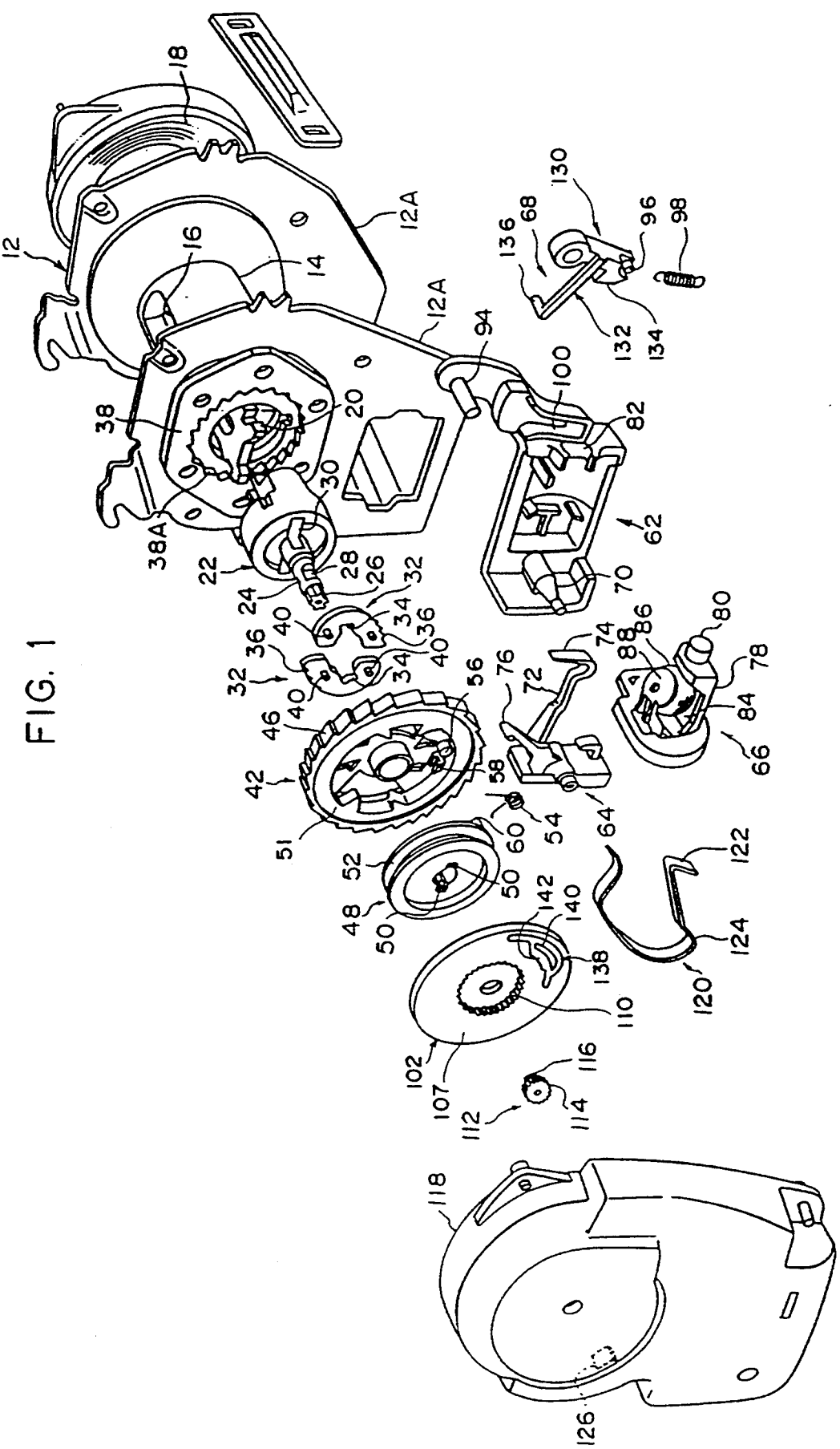
FIG. 1 is an exploded perspective view of one embodiment of a webbing retractor of the present invention.

In the webbing retractor, a frame 12 shown in FIG. 1 is secured to a vehicle body by unillustrated bolts. The frame 12 is provided with a pair of leg plate portions 12A extending in parallel from both sides of the frame 12.

A winding shaft 14 is supported by these leg plate portions 12A. A through-hole 16 is provided to pass through a shaft center of the winding shaft 14 and to pass through in the radial direction of the winding shaft 14. One end of an occupant securing webbing (not shown) is engaged with the through-hole 16. Further, one end of a power spring 18 is anchored to one end of the winding shaft 14 so as to continuously urge the winding shaft 14 in the webbing retracting direction. For this reason, the occupant securing webbing is normally retracted onto the winding shaft 14 in layered form. In order to be in a webbing harnessing condition, after the webbing is drawn-out, a tongue plate provided at an intermediate portion of the webbing engages a buckle apparatus mounted on the vehicle body. Thus, the webbing is in the webbing harnessing condition.

Projecting portions 20 are provided at the other end of the winding shaft 14. A transmission member 22 is fitted to the projecting portions 20. A projecting portion 24 projects from a shaft center portion of the transmission member 22, and a pinion gear 26 is provided at a distal end of the projecting portion 24. The projecting portion 24 is provided with a pair of notch portions 28. Further, passing holes 30 are provided in a vicinity of the base portion of the projecting portion 24. The passing holes 30 are provided such that the projecting portions 20 pass through the passing holes 30, and project from the transmission member 22 when the transmission member 22 is fitted to the projecting portions 20 of the winding shaft 14.

A pair of lock plates 32 are disposed outwardly in the radial direction of the projecting portion 24. A substantially U-shaped notched concave portion 34 is provided for each intermediate portion of these substantially C-shaped lock plates 32. The projecting portion 20 of the winding shaft 14 is fitted into the notched concave portion 34 so as to rotate with the winding shaft 14.

Width dimension of the notched concave portion 34 is provided slightly larger than that of the projecting portion 20. Accordingly, the lock plate 32 is relatively rotatable by a predetermined angle with respect to the winding shaft 14.

Claw portions 36 are respectively provided in the vicinity of one ends of these lock plates 32, and correspond to lock teeth 38A of an internal gear ratchet wheel 38 secured to the leg plate portions 12A.

Further, respective pairs of pins 40 project from the lock plates 32. The pins 40 are fitted into elongated holes 44 (see FIG. 2) provided in a lock ring 42. The lock ring 42 is a ratchet wheel which is supported by the projecting portion 24 and has a large diameter, and is relatively rotatable with respect to the winding shaft 14. Ratchet teeth 46 are provided on an outer periphery of the lock ring 42. A rotary wheel 48 is provided outwardly in the axial direction of the lock ring 42, and is supported by the projecting portion 24.

Anchoring claws 50 are provided in a vicinity of the shaft center of the rotary wheel 48, and are fitted into the notch portions 28 of the projecting portion 24 so as to rotate with the transmission member 22. That is, so as to rotate integrally with the winding shaft 14. A spring receiving portion 52 having a U-shaped section is provided around an outer periphery of the rotary wheel 48. A helical coil spring 54 is interposed between the rotary wheel 48 and the lock ring 42.

The helical coil spring 54 is supported by a supporting projection 56 projecting from the lock ring 42. One end of the helical coil spring 54 contacts a spring anchoring pin 58 provided on the lock ring 42, and the other end thereof contacts a spring anchoring pin 60 projecting from the rotary wheel 48. Through the urging force of the helical coil spring 54, the lock ring 42 is continuously urged to rotate in the webbing drawing-out direction of the winding shaft 14, and rotates according to the movement of the winding shaft 14.

Figure 2:
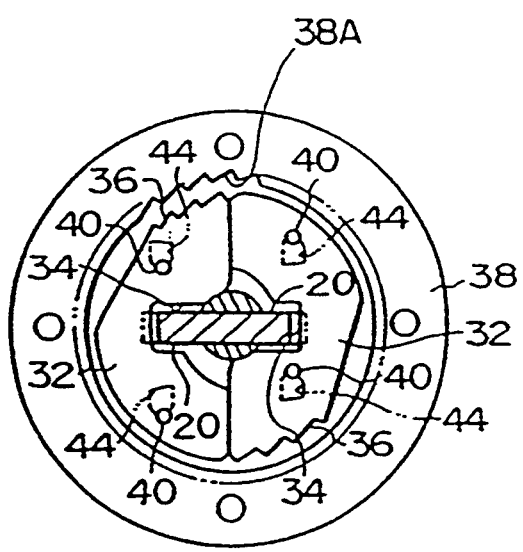
FIG. 2 is a front view showing a corresponding relationship between a lock plate and an internal gear ratchet wheel of the embodiment of the webbing retractor of the present invention.
Figure 3:
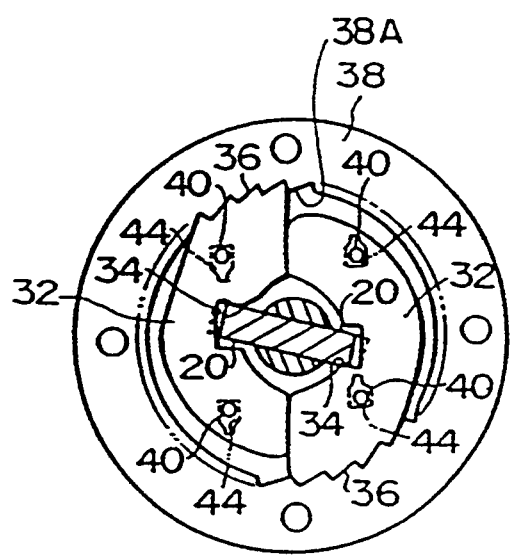
FIG. 3 is an operational view of FIG. 2.
Figure 4:
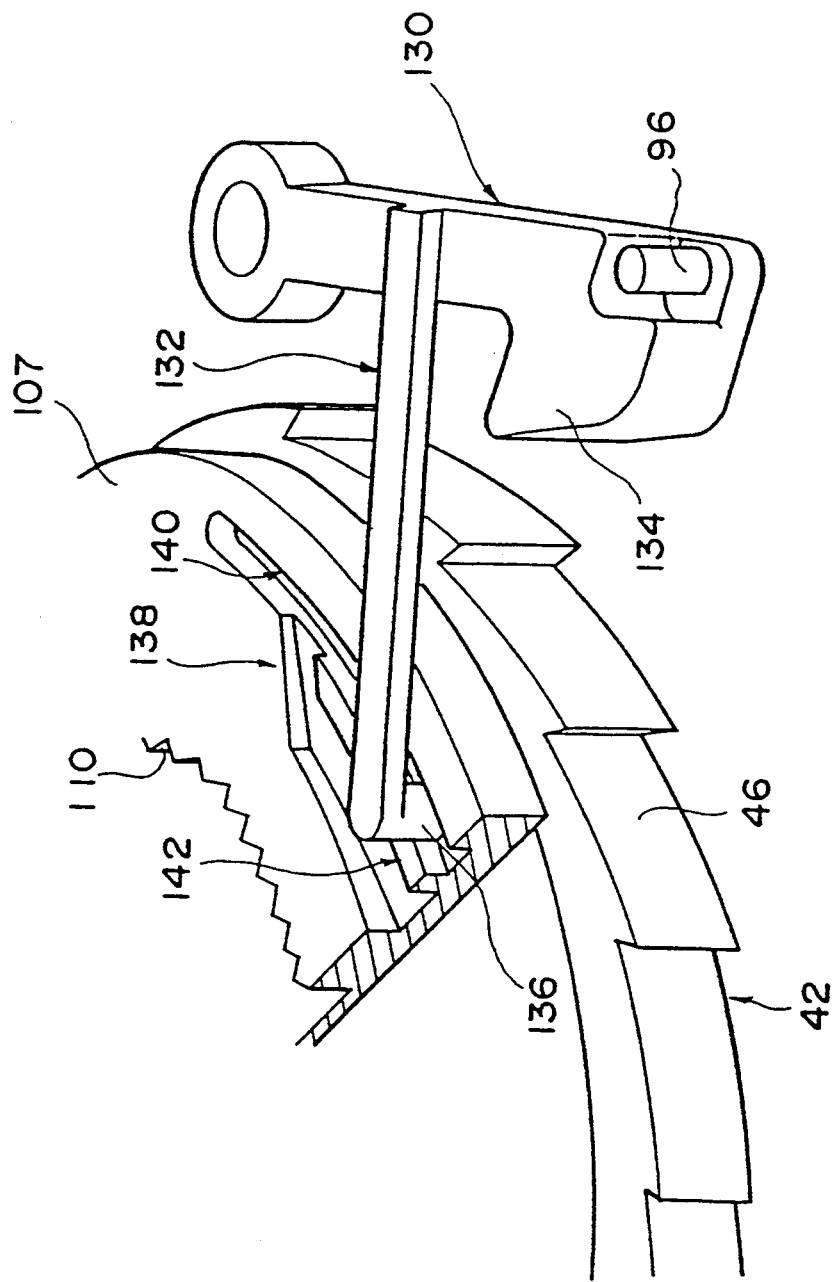
FIG. 4 is a perspective view showing a condition where an engaging pin engages a guide groove.
Figure 5:
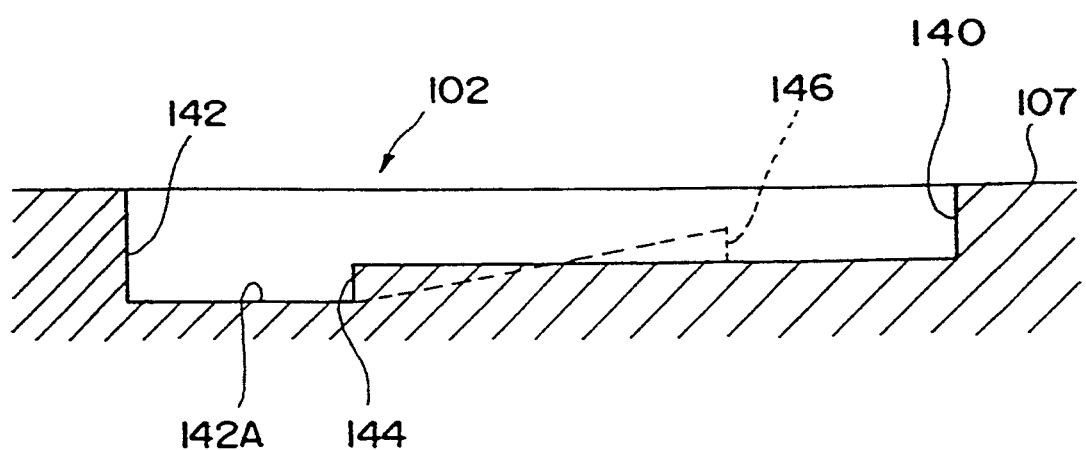
FIG. 5 is a sectional view taken along line 5—5 of FIG. 6.

Hence, as shown in FIG. 2, the pins 40 of the lock plate 32 are normally positioned on one end side of the elongated hole 44. The claw portions 36 of the lock plate 32 are separated from the lock teeth 38A. However, when a rotational delay is caused between the lock ring 42 and the winding shaft 14 rotating in the webbing drawing-out direction since the lock ring 42 resists the urging force of the helical coil spring 54, the lock ring 42 guides the pins 40 of the lock plate 32 to the other end side of the elongated holes 44. Thus, the claw portion 36 can engage the lock teeth 38A (in a condition shown in FIG. 3).

As shown in FIG. 1, an inertial member 51 is provided on the surface side of the lock ring 42, which opposes to the rotary wheel 48. The inertial member 51 is metallic and is provided in a ring form at a peripheral edge portion of the lock ring 42. Hence, if acceleration equal to a predetermined value or more is exerted on the winding shaft 14 in the webbing drawing-out direction, inertial force is applied to the lock ring 42. Accordingly, the lock ring 42 resists the urging force of the helical coil spring and causes rotational delay with respect to the winding shaft 14 based upon the inertial force. Therefore, in a normal condition, the webbing can be freely retracted and drawn-out. The webbing is in ELR condition for preventing the drawing-out of the webbing when the vehicle rapidly decelerates. A sensor holder 62 is secured to the leg plate portion 12A immediately under the lock ring 42. An ELR lever 64, an acceleration sensor 66 and an ALR lever 68 are respectively assembled with respect to the sensor holder 62.

The ELR lever 64 is provided in a substantially L-shaped form, and is supported by a supporting shaft 70 extending from one end of the sensor holder 62. An engaging portion 74, bent in the upward direction of the vehicle, is provided at a distal end of an arm portion 72. When the acceleration sensor 66 is operated, the engaging portion 74 is driven to rotate and engage the ratchet teeth 46 so as to stop the rotation of the lock ring 42. Further, the ELR lever 64 is provided with a releasing arm 76. The releasing arm 76 is pressed so as to release the engagement of the engaging portion 74 with the ratchet teeth 46.

A mounting projection 80 of a case 78 is fitted into a receiving portion 82 of the sensor holder 62 so as to mount the acceleration sensor 66. A ball 86 is disposed in a conical receiving portion 84, and can rise up on a surface of the conical receiving portion 84 when inertia is exerted on the ball 86.

One end of an actuator 88 supported by the acceleration sensor 66 is mounted on the ball 86. When the one end is pushed upward by the ball 86, the arm portion 72 of the ELR lever 64 rotates about the supporting shaft 70. Consequently, the engaging portion 74 of the ELR lever 64 engages the ratchet teeth 46 of the lock ring 42.

The ALR lever 68 is provided with an engaging lever 130 and an arm 132 provided integrally with the engaging lever 130. One end of the engaging lever 130 is rotatably supported by a supporting shaft 94 extending from one end of the sensor holder 62. A claw portion 134 is provided at the other end of the engaging lever 130 in a substantially L-shaped form. The claw portion 134 is bent toward the side of the lock ring 42 so as to be engagable with the ratchet teeth 46.

Further, the engaging lever 130 is provided with an anchoring projection 96. One end of a compression coil spring 98 is secured to the anchoring projection 96. The other end of the compression coil spring 98 is accommodated in a U-shaped spring accommodating portion 100 which is provided on the sensor holder 62. Hence, the ALR lever 68 is operated in a snap action as follow: the claw portion 134 engages the ratchet teeth 46 of the lock ring 42 through the urging force of the compression coil spring 98 when the engaging lever 130 is positioned on the side of the lock ring 42 (that is, on an engaging position side) with respect to a neutral position where an axial center of the compression coil spring 98 becomes linear (see FIG. 9). Further, when the engaging lever 130 is positioned on the opposite side of the lock ring 42 (that is, on a disengaging position side) with respect to the neutral position, the claw portion 134 is separated from the ratchet teeth 46 by the urging force of the compression coil spring 98 (see FIG. 6).

The arm 132 extends from a longitudinal intermediate portion of the engaging lever 130 perpendicular to the longitudinal direction of the engaging lever 130, and extends toward the side of a releasing gear 102 which is rotatably supported by the projecting portion 24 of the transmission member 22. An engaging pin 136 is provided at a distal end of the arm 132 toward the side of an end surface 107 of the releasing gear 102. The engaging pin 136 is fitted into a guide groove 138 provided in the end surface 107 of the releasing gear 102.

A circular concave portion is provided in an intermediate portion of the releasing gear 102. An internal teeth gear 110 is provided in a peripheral wall of the concave portion. The internal teeth gear 110 engages the pinion gear 26 through an intermediate gear 112. The intermediate gear 112 is a double-gear in which a large diameter gear portion 114 and a small diameter gear portion 116 are integrally provided with each other. The intermediate gear 112 is rotatably supported by a cover 118. The pinion gear 26 engages the large diameter gear portion 114 and the small diameter gear portion 116 engages the internal teeth gear 110. Therefore, decelerated rotation of the winding shaft 14 can be transmitted to the releasing gear 102. The releasing gear 102 is rotated in a direction opposite to a rotational direction of the winding shaft 14.

Figure 6:
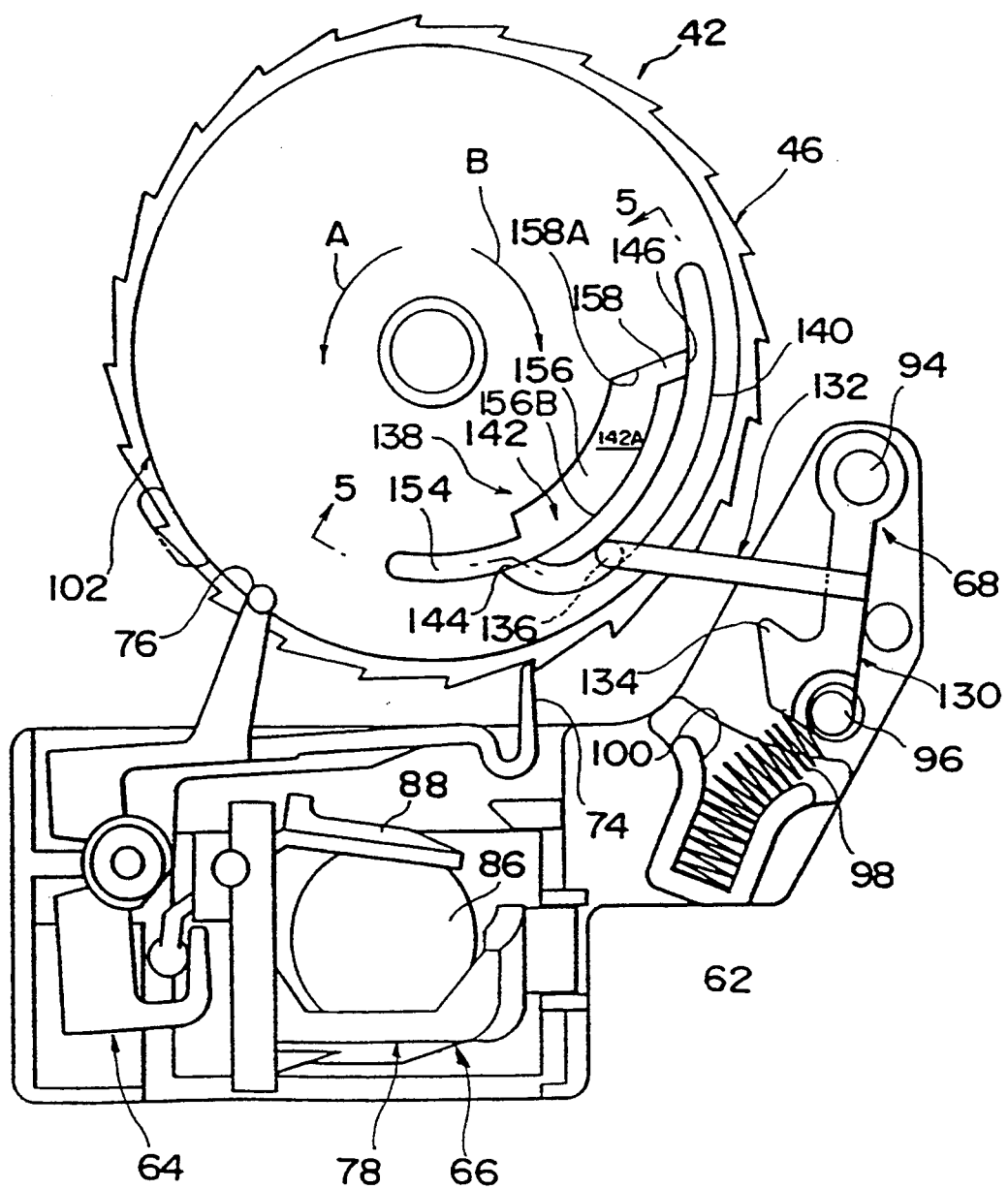
FIG. 6 is a front view showing an operation of a lock mechanism portion of the embodiment of the webbing retractor of the present invention.
Figure 7:
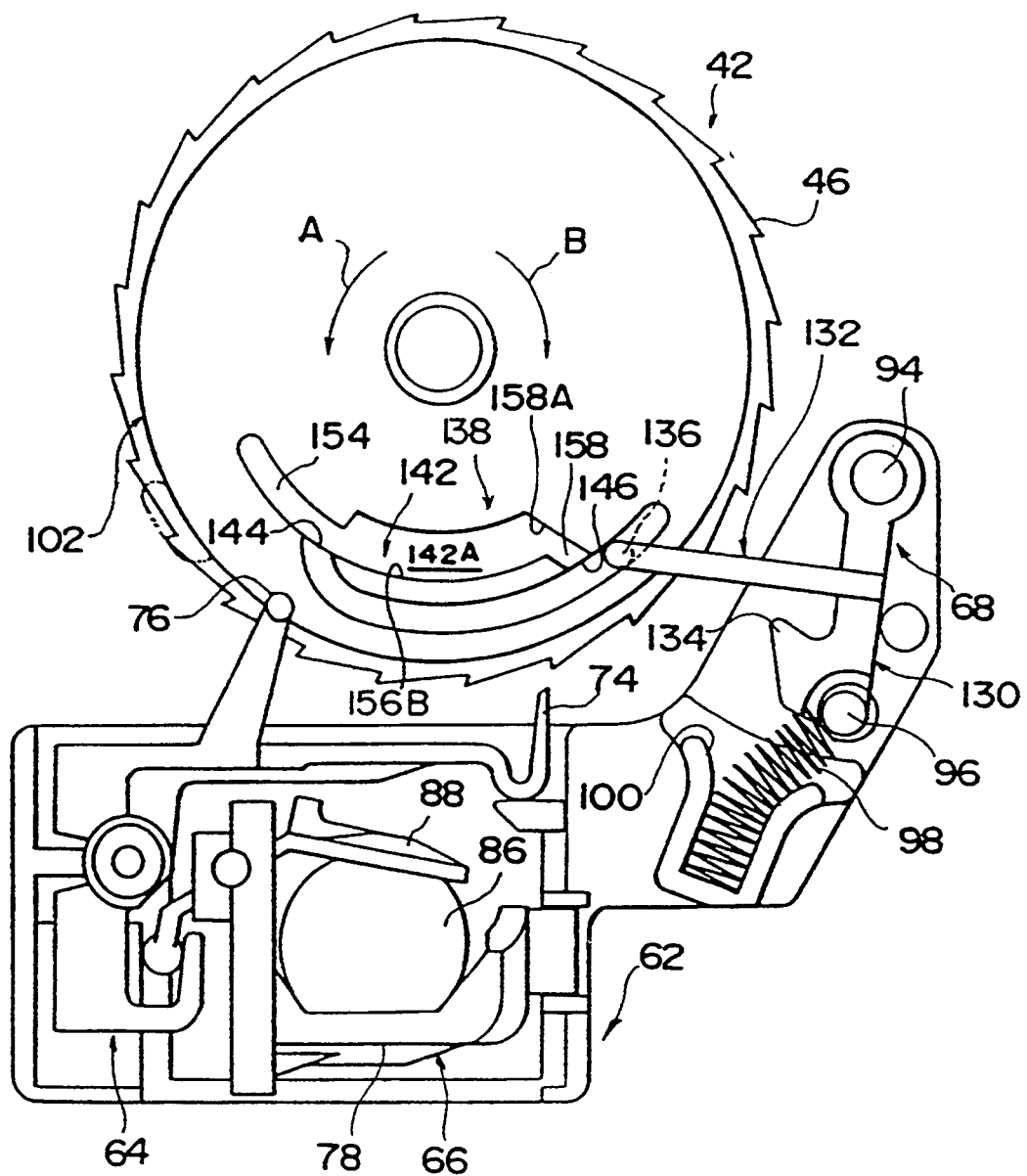
FIG. 7 is an operational view of FIG. 6.

A guide groove 138 is provided in the end surface 107 of the releasing gear 102, and is provided with an outside cam groove 140 and an inside cam groove 142. As shown in FIGS. 6 to 9, the outside cam groove 140 is provided in a substantially circular arc-shaped form along a circumferential direction of the releasing gear 102. The outside cam groove 140 is provided such that the engaging pin 136 of the engaging lever 130 can be fitted into the outside cam groove 140. In a fitted condition (which is shown in FIG. 6), the engaging lever 130 is positioned on the disengaging position side, and is urged by the urging force of the compression coil spring 98 to the disengaging position. The arm 132 serves to press and load a distal end of the engaging pin 136 to a bottom of the guide groove 138.

Figure 8:
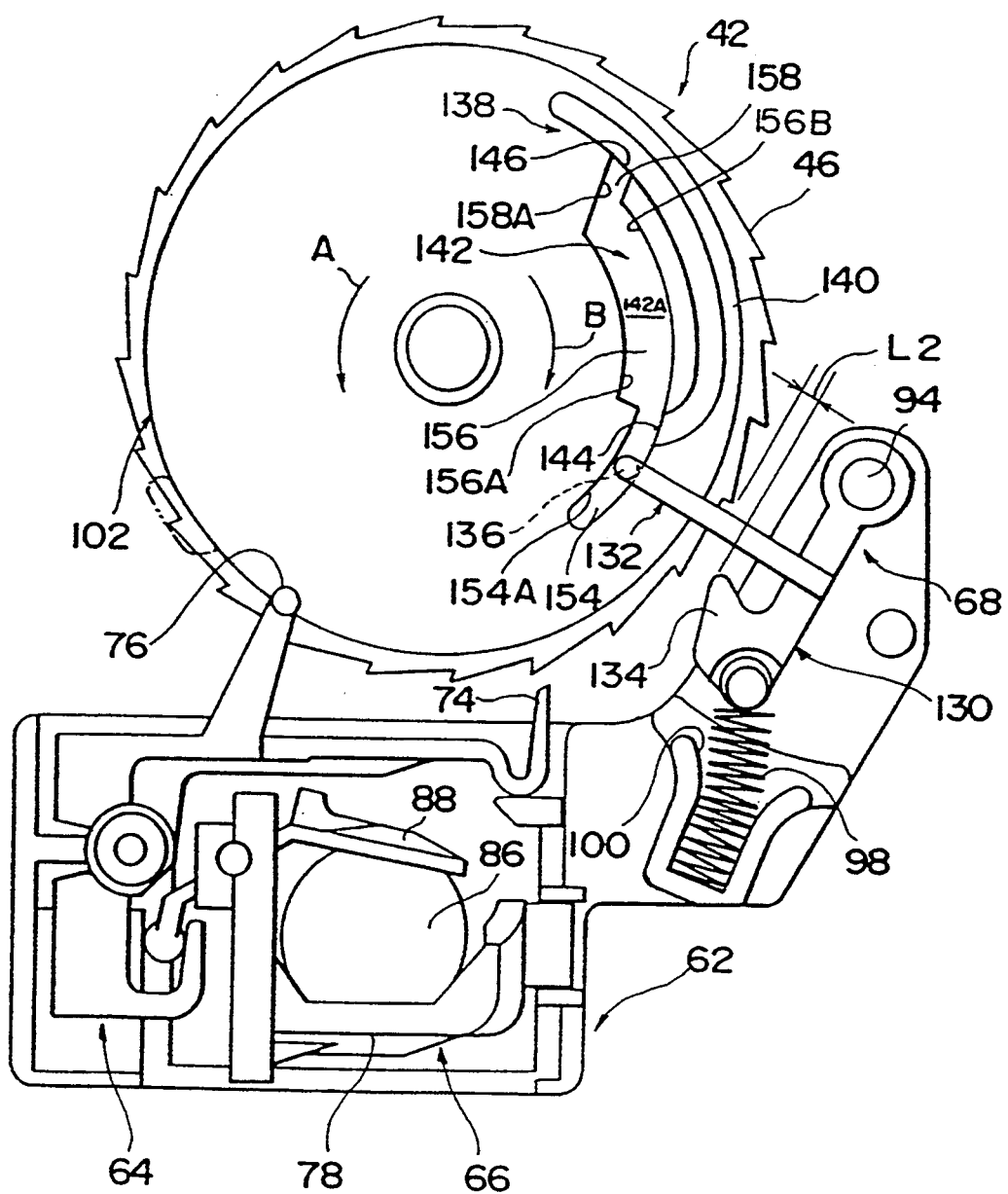
FIG. 8 is the operational view of FIG. 6.

Both ends of the outside cam groove 140 are communicated with the inside cam groove 142 through a step portion 144 and a step portion 146, respectively. As shown by the one-dotted line in FIG. 5, the inside cam groove 142 is inclined such that a bottom portion 142A gradually comes close to the end surface 107 of the releasing gear 102 from the side of the step portion 144 toward the side of the step portion 146. As shown in FIGS. 6 to 9, a portion of the inside cam groove 142 in the vicinity of the step portion 144 is defined as a narrow width groove portion 154. A portion of the inside cam groove 142 in the vicinity of the step portion 146 is defined as a switching groove portion 158 including a guide wall 158A for guiding and introducing the engaging lever 130 to the disengaging position side. An intermediate portion of the inner cam groove 142 is defined as a wide width groove portion 156 which is wider than the narrow width groove portion 154 so as to be close to a shaft center of the releasing gear 102. As shown in FIG. 8, the narrow width groove portion 154 serves such that the engaging lever 130 is positioned on the engaging position side and the claw portion 134 is separated from the ratchet teeth 46 while the engaging pin 136 is fitted into the narrow width groove portion 154. Accordingly, the engaging lever 130 is loaded on the engaging position side by the compression coil spring 98 in a condition where the engaging lever 130 is fitted into the narrow width groove portion 154. However, the engaging pin 136 contacts a inner wall 154A of the narrow width groove portion 154 (in a condition shown in FIG. 8) so that clockwise rotation of the engaging lever 130 centered on the supporting shaft 94 in FIG. 8 is restricted. As a result, the claw portion 134 never engages the ratchet teeth 46.

Figure 9:
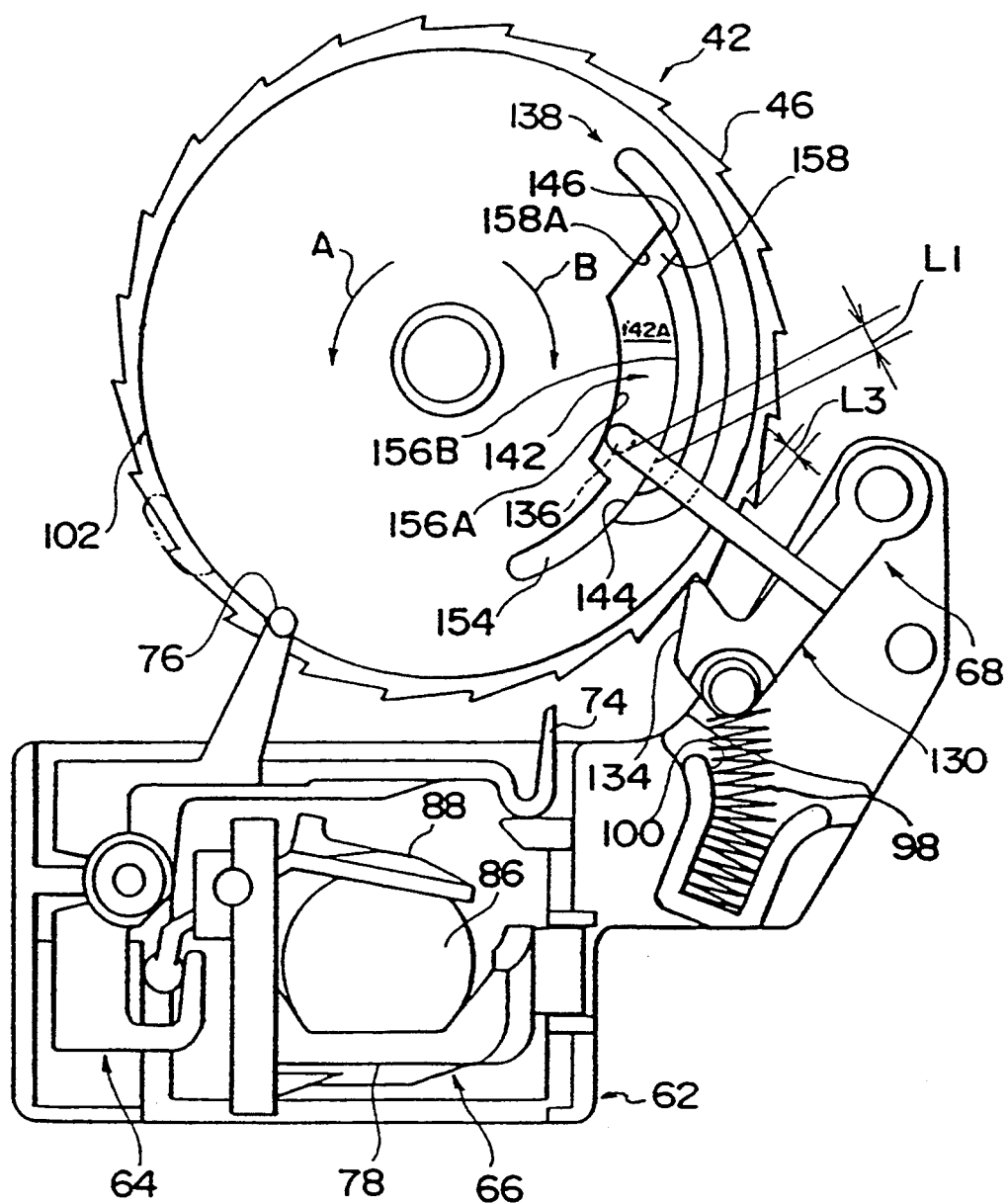
FIG. 9 is the operational view of FIG. 6.

An inner wall 156A of the wide width groove portion 156 is provided nearer to the shaft center of the releasing gear 102 than the inner wall 154A of the narrow width groove portion 154. As shown in FIG. 9, in a condition where the engaging pin 136 is positioned in the wide width groove portion 156, the engaging lever 130 is pressed to the engaging position side by the loading force of the compressing coil spring 98 through the engaging pin 136. Consequently, the engaging pin 136 is in contact with the inner wall 156A. In this contacting condition, the engaging lever 130 is positioned so as to engage the claw portion 134 with the ratchet teeth 46. That is, an interval L1 between the engaging pin 136 and an inner wall 156B of the wide width groove portion 156 is set larger than an interval L2 between the claw portion 134 and the ratchet teeth 46 (see FIG. 8). Further, in the embodiment, the interval L1 between the engaging pin 136 and the inner wall 156B is set larger than tooth depth L3 of the ratchet teeth 46 (see FIG. 9). It is assumed that the engaging lever 130 is pressed counterclockwise in FIG. 9 by a friction spring 120 as will be described later in a condition where the engaging pin 136 is fitted into the wide width groove portion 156. Hence, it is possible to release an engagement of the claw 134 with the ratchet teeth 46. Therefore, when the engagement between the claw 134 and the ratchet teeth 46 is released by the friction spring 120, it is possible to avoid bounding of the claw portion 134 and an intermittent contacting noise generated when rotating the winding shaft 14 in the webbing retracting direction with the ALR lever 68 in contact with the lock ring 42.

The guide wall 158A of the switching groove portion 158 is provided such that the releasing gear 102 is rotated to press the engaging pin 136 against the urging force of the compression coil spring 98. The engaging lever 130 is guided to the disengaging position side while the engaging pin 136 is fitted into the switching groove portion 158. Further, the switching groove portion 158 has a shallower tooth depth than that of the outside cam groove 140. Accordingly, when the webbing is wound-up to rotate the releasing gear 102 in a clockwise direction of FIG. 9 from a condition shown in FIG. 9, the engaging pin 136 is fitted into the outside cam groove 140 after passing the step portion 146. In this condition, the engaging lever 130 is positioned on the disengaging position side, and the loading force of the compression coil spring 98 serves to maintain a separated condition between the ratchet teeth 46 and the claw portion 134 (in a condition shown in FIG. 7).

The friction spring 120 is mounted to the spring receiving portion 52 of the rotary wheel 48. The friction spring 120 is a substantially U-shaped plate spring, and is provided with a bent ALR contacting portion 122 and a bent ELR contacting portion 124. An intermediate portion of the friction spring 120 contacts the spring receiving portion 52 with pressure. Hence, when the winding shaft 14 is rotated in the webbing drawing-out direction, the ELR contacting portion 124 contacts a stopper 126 provided for the cover 118 so as to block a further rotation of the winding shaft 14. When the winding shaft 14 is rotated in the webbing winding-up direction, the ELR contacting portion 124 contacts and presses the releasing arm 76 so as to slightly separate the engaging portion 74 from the ratchet teeth 46. Further, when the engaging lever 130 engages the ratchet teeth 46, the winding shaft 14 is rotated in the webbing retracting direction so that the ALR contacting portion 122 contacts and presses the engaging lever 130 so as to slightly separate the engaging lever 130 from the ratchet teeth 46. In this case, the pressing force of the ALR contacting portion 122 for pressing the engaging lever 130 is transmitted through frictional force of the friction spring 120. Therefore, the pressing force is less than the loading force of the compression coil spring 98. The claw portion 134 is never completely separated from the ratchet teeth 46, and the engagement between the claw portion 134 and the ratchet teeth 46 is never released. Thus, the pressing force of the ALR contacting portion 122 simply causes the engaging lever 130 to separate slightly from the lock ring 42 when retracting the webbing. Thus, noises generated when retracting the webbing can be easily eliminated.

A description will now be given of the operation of the embodiment.

When the occupant draws-out the webbing, the lock ring 42 rotates integrally with the winding shaft 14 without rotational delay with respect to the winding shaft 14. In this case, it is possible to draw-out the webbing easily since the lock plate 32 does not engage the locking teeth 38A (in a condition shown in FIG. 2).

As set forth above, an acceleration having a predetermined value or more in the webbing drawing-out direction is exerted on the winding shaft 14 by inertial force of the occupant when the vehicle rapidly decelerates when the drawn-out webbing is mounted. Hence, the winding shaft 14 is rapidly rotated to generate rotational delay of the lock ring 42 with respect to the winding shaft 14. The winding shaft 14 and the lock ring 42 are relatively rotated as the webbing is drawn-out. The relative rotation causes the lock plate 32 to move from the disengaged position where the lock plate 32 is separated from the lock teeth 38A to the engaging position. The claw portion 36 of the lock plate 32 engages the lock teeth 38A due to movement so as to block the rotation of the winding shaft 14 in the webbing drawing-out direction (in a condition shown in FIG. 3). Further, when the vehicle rapidly decelerates, the ball 86 pushes the actuator 88 upward so as to rotate the ELR lever 64 about the supporting shaft 70. The engaging portion 74 engages the ratchet teeth 46 by the rotation of the ELR lever 64 (in a condition shown in FIG. 6). Thus, the ELR condition is provided wherein the webbing can be drawn-out and retracted in a normal condition. The drawing-out of the webbing is prevented when the vehicle rapidly decelerates.

On the other hand, the ALR condition is provided when the claw portion 134 of the engaging lever 130 engages the ratchet teeth 46 of the lock ring 42 (in a condition shown in FIG. 9). In the ALR condition, the rotation of the lock ring 42 in the webbing drawing-out direction is prevented since the claw portion 134 engages the ratchet teeth 46. The drawing-out of the webbing generates the relative rotation between the lock ring 42 and the winding shaft 14. Subsequently, the claw portion 36 of the lock plate 32 engages the lock teeth 38A so as to block the rotation of the winding shaft 14 in the webbing drawing-out direction. Hence, the ALR condition is provided wherein the drawing-out of the webbing is prevented irrespective of whether in a normal condition or at a time when the vehicle rapidly decelerates.

In order to switch over the lock mechanism of the winding shaft 14 from ELR to ALR, the webbing is drawn-out. That is, the releasing gear 102 is rotated and moved with the winding shaft 14, and is rotated in the direction opposite to the winding shaft 14. That is, in the direction shown by the arrow marked A in FIG. 7 with the engaging pin 136 fitted into the outside cam groove 140 while the webbing is drawn-out. When the amount of the drawing-out of the webbing becomes substantially maximum, the engaging lever 130 resists the urging force of the compression coil spring 98 to move on the engaging position side across the neutral position. Further, the engaging lever 130 is fitted into the narrow width groove portion 154 (in a condition shown in FIG. 8). In this condition, the engaging lever 130 is urged by the urging force of the compression coil spring 98 in a direction to engage the claw portion 134 with the ratchet teeth 46. However, in the embodiment, the engaging pin 136 contacts the inner wall 154A of the narrow width groove portion 154 so that the claw portion 134 never engages the ratchet teeth 46. That is, the lock ring 42 is freely rotatable in the webbing drawing-out direction, and is rotatable in the webbing drawing-out direction with the lock plate 32. In this case, if rotational delay of the lock ring 42 is generated by the inertial member 51 when drawing-out the webbing, the lock plate 32 never engage the lock teeth 38A at accurate positions so as to generate a disengagement of the teeth. Even if a force is exerted on the lock ring 42 in a direction different from the guiding direction of the pins 40 of the lock plate 32, the lock ring 42 is rotated with the lock plate 32 in the webbing drawing-out direction since the ratchet teeth 46 of the lock ring 42 never engages the engaging lever 130. Therefore, it is possible to avoid load applied to each member forming the webbing retractor.

When the webbing is retracted in a condition (which is shown in FIG. 8) where the engagement between the engaging lever 130 and the lock ring 42 is blocked, the releasing gear 102 is rotated in a clockwise direction of FIG. 8. Subsequently, the engaging pin 136 escapes from the narrow width groove portion 154. The engaging lever 130 is rotated and moved by the urging force of the compression coil spring 98 about the supporting shaft 94 in the clockwise direction of FIG. 8. The engaging pin 136 is fitted into the wide width groove portion 156 so that the engaging pin 136 contacts the inner wall 156A of the wide width groove portion 156. Accordingly, the claw portion 134 engages the ratchet teeth 42 to be switched over to ALR (in a condition shown in FIG. 9). A boundary portion between the outside cam groove 140 and the narrow width groove portion 154 is defined as the step portion 144. Hence, the engaging pin 136 is not moved to the outside cam groove 140 again when the engaging pin 136 is moved from the narrow width groove portion 154 to the wide width groove portion 156.

In order to switch over the lock mechanism of the winding shaft 14 from ALR to ELR, a substantially entire amount of the webbing may be retracted. That is, as the webbing is retracted, the releasing gear 102 is rotated in the clockwise direction of FIG. 9 (in the direction shown by the arrow marked B) so that the guide wall 158A presses the engaging pin 136. Thus, the engaging lever 130 receives a rotational force about the supporting shaft 94 in the counterclockwise direction of FIG. 9, and against the urging force of the compression coil spring 98 so as to move to the disengaging position side. When the substantially entire amount of the webbing is retracted, the engaging pin 136 is fitted with the outside cam groove 140 across the step portion 146, and is moved to the disengaged position by the urging force of the compression spring 98. Hence, the engaging lever 130 is maintained in the ELR condition where the ratchet teeth 46 are separated from the engaging lever 130 (in a condition shown in FIG. 7).

As set forth above, in the embodiment, the webbing is drawn-out and is thereafter retracted again so as to engage the engaging lever 130 with the ratchet teeth 46. Therefore, the embodiment is completely different from the conventional webbing retractor wherein the engaging lever 130 engages the ratchet teeth 46 when the maximum amount or a substantially maximum amount of the webbing is drawn-out. That is, according to the present invention, it is not necessary to set a highly-accurate retracting amount of the webbing. It is only necessary to engage the engaging lever 130 with the ratchet teeth 46 simply depending upon the retracting of the webbing. As a result, it is not necessary to have high assembling accuracy of the releasing gear 102 and high dimensional accuracy of the cam groove 138.

What is claimed is:
1. A webbing retractor for a vehicle comprising:
a winding shaft for retracting a webbing;

a relative rotary member connected to said winding shaft which generates rotational delay with respect to said winding shaft due to an inertial force exerted by said relative rotary member when at least one of rapid drawing-out of said webbing and sudden deceleration of the vehicle occurs;

lock means connected to said winding shaft for preventing a drawing-out of said webbing from said winding shaft after said generation of said rotational delay;

an engaging member having a first portion engageable with and disengageable with said relative rotary member, said engaging member being movable between a separated position where said engaging member is separated from said relative rotary member and an engaged position where said engaging member engages said relative rotary member;

a moving member connected to said winding shaft and rotatable therewith and operatively associated with said engaging member; and guiding means provided in said moving member for guiding a second portion of said engaging member, during rotation of said moving member caused by movement of said winding shaft as said webbing is drawn out, to a predetermined engaging waiting position intermediate to said engaged position and to said separated position such that said engaging member disengages said relative rotary member, and for guiding said engaging member to said engaged position from said engaging waiting position during rotation of said moving member caused by movement of said winding shaft as said webbing is retracted.

2. A webbing retractor according to claim 1, wherein said engaging member includes an engaging lever, said engaging lever being engagable with said relative rotary member.

3. A webbing retractor according to claim 2, wherein said engaging member includes a guide arm, one end of said guide arm being coupled with said engaging lever and another end of said guide arm engaging said guide means.

4. A webbing retractor according to claim 2, wherein said engaging member includes an urging member coupled with one end of said engaging lever, said urging member urging said engaging member in one of the direction of said separated position and the direction of said engaging position depending upon the position of said engaging member with respect to said relative rotary member.

5. A webbing retractor according to claim 1, wherein said guide means is a plurality of grooves.

6. A webbing retractor according to claim 5, wherein said plurality of grooves include a first groove provided in a vicinity of an outer peripheral portion of said moving member, and a second groove coupled with at least a part of said first groove and provided at a position close to a rotational center of said moving member with respect to a position of said first groove.

7. A webbing retractor according to claim 6, wherein a narrow width groove portion is provided in a longitudinal one end of said second groove, said narrow width groove portion positioning said engaging member at said engaging waiting position.

8. A webbing retractor according to claim 7, wherein a longitudinal intermediate portion of said second groove is provided with a wide width groove portion having a larger width in the direction perpendicular to the longitudinal direction than that of said narrow width groove portion, said wide width groove portion positioning said engaging member at said engaging position directly.

9. A webbing retractor according to claim 6, wherein said plurality of grooves include a first step portion, said first step portion being provided in a coupling portion between a longitudinal one end of said first groove and a longitudinal intermediate portion of said second groove, for preventing said engaging member from moving from said engaging waiting position to said separated position.

10. A webbing retractor according to claim 9, wherein said plurality of grooves include a second step portion, said second step portion being provided in a second coupling portion between a longitudinal one end of said second groove and a longitudinal intermediate portion of said first groove, for preventing said engaging member from moving from said separated position to said engaging position directly.

11. A webbing retractor according to claim 1 further comprising:

an acceleration sensor for sensing a rapid deceleration condition of the vehicle having means for stopping rotation of said relative rotary member.

12. A webbing retractor according to claim 1 further comprising:

frictional moving means for receiving rotational force of said winding shaft as frictional force, and for forcedly releasing said engaging member from engagement between said relative rotary member and said engaging member when said frictional moving means contacts a portion of said engaging member and said frictional moving means is rotated in the webbing retracting direction.

13. A webbing retractor for a vehicle comprising:
a winding shaft for retracting a webbing;
a lock ring connected to said winding shaft which generates rotational delay with respect to said winding shaft due to an inertial force exerted by said lock ring when at least one of a rapid drawing-out of said webbing and sudden deceleration of the vehicle occurs;

lock means connected to said winding shaft for preventing a drawing-out of said webbing from said winding shaft after said generation of said rotational delay;

an engaging lever engageable with the disengageable with said lock ring, said engaging lever being movable between a separated position where said engaging lever is separated from said lock ring and an engaged position where said engaging lever engages said lock ring;

a moving member connected to said winding shaft and rotatable therewith and operatively associated with said engaging member; and a plurality of grooves provided in said moving member for guiding said engaging lever, during rotation of said moving member caused by movement of said winding shaft as said webbing is drawn out, to an engaging waiting position intermediate to said engaged position and to said separated position such that said engaging lever disengages said lock ring, and for guiding said engaging lever to said engaged position from said engaging waiting position during rotation of said moving member caused by movement of said winding shaft as said webbing is retracted; and a guide arm having one end coupled with said engaging lever and the other end engaging any one of said plurality of grooves.

14. A webbing retractor according to claim 13 further comprising:

a compression coil spring coupled with one end of said engaging lever, for urging said engaging lever to move in the direction of said separated position and in the direction of said engaging position.

15. A webbing retractor according to claim 13, wherein said plurality of grooves include a first groove provided in a vicinity of an outer peripheral portion of said moving member, and a second groove coupled with at least a part of said first groove and provided at a position close to a rotational center of said moving member with respect to a position of said first groove.

16. A webbing retractor according to claim 15, wherein a longitudinal one end of said second groove is provided with a narrow width groove portion, the other end of said guide arm being positioned at said narrow width groove portion so as to position said engaging lever at said engaging waiting position.

17. A webbing retractor according to claim 16, wherein a longitudinal intermediate portion of said second groove is provided with a wide width groove portion having wider width in the direction perpendicular to the longitudinal direction than that of said narrow width groove portion, the other end of said guide arm being positioned at said wide width groove portion so as to position said engaging lever at said engaging position.

18. A webbing retractor according to claim 15, wherein said plurality of grooves include a first step portion, said first step portion being provided in a coupling portion between a longitudinal one end of said first groove and a longitudinal intermediate portion of said second groove, for preventing said guide arm from moving from said second groove to said first groove, and preventing said engaging lever from moving from said engaging waiting position to said separated position.

19. A webbing retractor according to claim 18, wherein said plurality of grooves include a second step portion, said second step portion being provided in a second coupling portion between a longitudinal one end of said second groove and a longitudinal intermediate portion of said first groove, for preventing said guide arm from moving from said first groove to said second groove, and preventing said engaging lever from moving from said separated position to said engaging position directly.

20. A webbing retractor according to claim 13 further comprising:

an acceleration sensor for sensing a rapid deceleration condition of the vehicle having means for stopping rotation of said lock ring.

21. A webbing retractor according to claim 13 further comprising:

frictional moving means for receiving rotational force of said winding shaft as frictional force, and for forcedly releasing said engaging lever from engagement between said engaging lever and said lock ring when said frictional moving means is rotated in the webbing retracting direction.

* * * * *